3,426,078
PROCESS FOR THE PRODUCTION OF HEAT-STABLE FLUORINATED ORTHOCARBONATES, AND NOVEL COMPOUNDS PRODUCED THEREBY
Marion E. Hill, Palo Alto, Calif., assignor to Stanford Research Institute, Menlo Park, Calif., a corporation of California
No Drawing. Original application Mar. 2, 1964, Ser. No. 348,844. Divided and this application June 22, 1967, Ser. No. 647,894
U.S. Cl. 260—615        7 Claims
Int. Cl. C07c *43/00, 43/28*

ABSTRACT OF THE DISCLOSURE

The invention comprises a process of interacting substantially perfluorionated primary aliphatic alcohols (having an unsubstituted methylene radical attached to the hydroxyl radical) with certain tetrahalomethyl compounds (more fully defined below) in the presence of certain acid-acting catalysts, e.g., anhydrous ferric chloride, to produce novel class of substantially perfluorinated orthocarbonates, useful as hydraulic fluids, heat-exchange fluids, lubricants, and dielectric fluids.

---

This invention relates to a novel process for the production of certain highly fluorinated orthocarbonates.

In one of its aspects, the invention also pertains to a novel class of orthocarbonates, which are highly fluorinated, have a low hydrogen content, and possess certain high valuable and desirable properties, particularly with respect to fire resistance and stability to resist oxidation.

This application is a true division of the parent application, Ser. No. 348,844, filed on Mar. 2, 1964, now abandoned.

An object of the present invention is to provide a simple and efficient process for the production of highly fluorinated orthocarbonates from certain fluorinated aliphatic alcohols, said fluorinated orthocarbonates, as mentioned above, being novel compounds possessing valuable and highly desirable properties.

It has now been discovered that the above and other objects may be attained, according to the process of the present invention, by interacting a certain class of highly fluorinated aliphatic alcohols with certain tetrahalomethyl compounds, this reaction being effected under substantially anhydrous conditions and in the presence of catalytic amounts of an acid-acting catalyst. More specifically stated, the invention comprises a reaction between substantially perfluorinated primary aliphatic alcohols (which, however, have an unsubstituted methylene radical directly attached to the hydroxyl radical) and tetrahalomethyl compounds described more fully hereinbelow, said interaction being effected substantially under anhydrous conditions and in the presence of a catalytic amount of an acid-acting catalyst having the general formula $MX_n$, wherein M is a metal of the transition series, X is a halogen, and n is an integer equal to the valence of the metal of said catalyst.

As indicated above, one of the reacting compounds suitable for use in the preparation of the subject ortho esters comprises highly fluorinated, and preferably substantially perfluorinated, primary aliphatic alcohols in which the fluorinated alkyl radicals are attached to the hydroxyl radical via an unsubstituted methylene group or radical. This class of fluoro-alcohols may be stated to have the following general structural formula:

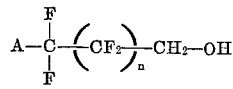

wherein n is an integer of from zero to ten, and A is either hydrogen, fluorine or another halogen, e.g., chlorine, bromine or iodine. The following are illustrative examples of the primary aliphatic fluoro-alcohols which fall within the above-defined class of compounds to be used in accordance with the present process to produce the subject fluorinated ortho esters:

1H,1H,7H-dodecafluoroheptyl alcohol,
1H,1H,5H-octafluoropentyl alcohol,
1H,1H,3H-tetrafluoropropyl alcohol,
1H,1H-pentafluoropropyl alcohol,
1H,1H-heptafluorobutyl alcohol, and
2-chloro-2,2-difluoroethyl alcohol.

As noted above, some of the "abnormal," i.e., fluorinated, alcohols set forth above are completely fluoro-substituted (perfluorinated) except for the unsubstituted methylene radical in alpha-position to the hydroxyl group. Others have a hydrogen or a chlorine atom on the omega carbon. These abnormal alcohols may be used, in the manufacture of the subject ortho esters in the same manner as if all of the carbon atoms (except the one in the alpha position to the hydroxyl radical) are completely fluorinated. In fact, in some cases, it may be possible to use alcohols which have a somewhat lesser fluorine-to-carbon ration, which alcohols have several, e.g., two or three, chlorine atoms attached to the alkyl radical of the alcohol.

It has been stated that the fluorinated alcohols (suitable for use in the manufacture of ortho esters in accordance with the process of the present invention) should have an unsubstituted methylene radical in the alpha position to the hydroxyl radical. The reason for this is that alpha halo-alcohols are unstable under the operating conditions. Also, it was pointed out that one should use primary alcohols: This is because when secondary fluorinated alcohols were reacted with, e.g., carbon tetrachloride, the reaction product was not an orthocarbonate, but the corresponding bis-carbonate, this probably due to steric hindrance. Also, when secondary alcohols were used even under the most optimum conditions, the reaction rate was found to be very low.

The tetrahalomethyl compounds to be reacted with the above-described fluoro-alcohols may be generally defined and shown by the following structural formula

wherein each Y is either chlorine or bromine. In this connection it must be noted that although one may use carbon tetrabromide, the corresponding chlorinated compounds, viz., carbon tetrachloride is preferred.

The catalyst found most suitable and effective for the subject reaction, which produces the desired orthocarbonates, is ferric chloride. Other illustrative examples of suitable catalysts, in the order of somewhat decreased or decreasing activity, are: antimony pentachloride, aluminum trichloride, and the corresponding bromides and iodides. The amount of this catalyst may vary within wide limits, although it has been found that an amount equal to 20 mol percent (based on the fluoro alcohol) will generally produce desired conversions. Nevertheless, one can use as low as 5 mol percent or as much as 100 mol percent, or even higher. Generally, too low a catalyst concentration will lower the rate of reaction, while high catalyst concentrations are wasteful.

In order to obtain satisfactorily good yields of orthocarbonates by the reaction of carbon tetrachloride and a fluoro-alcohol, the reaction, and therefore the catalyst, should be free from water. In fact it is generally necessary to use an absolutely anhydrous catalyst, which latter may be readily dried by removing the water from the ferric chloride by the catalyzed hydrolysis of carbon tetrachloride at the reflux temperature.

In reacting the above-described highly fluorinated alcohols with the tetrahalomethyl compounds, e.g., carbon tetrachloride, to produce the desired orthocarbonates, it is possible to use substantially any apparatus usually employed for similar reactions. Generally, it may be stated that the reactions will occur to a greater or lesser degree as long as the above two reactants are brought in intimate contact with each other in the presence of the defined acid-acting catalyst, e.g., ferric chloride. In this connection it has been found that, although the extent of the reaction (and thus the degree of reaction) can be varied within a relatively wide range, in order to obtain or approach optimum yields of the ortho esters, it is generally desirable, if not absolutely essential, to produce and maintain in the reaction zone as homogeneous a reaction system as possible. In fact, it has been discovered that the reaction (both in rate and extent) is affected by the degree of heterogeneity or homogeneity of the system, both the extent and rate of reaction being markedly improved when the system is homogeneous, or approaches homogeneity, at least insofar as the two reactants and the intermediaries of the reaction product are concerned.

The homogeneity of the reaction system may be increased and thus materially improved by the use of suitable solvents, as well as by varying the ratio of the reactants in the reaction vessel. Thus, although theoretically in order to obtain the desired orthocarbonates, one should employ the two reactants, i.e., the fluoro alcohol and the tetrahalomethyl in stoichiometric amounts, in order to obtain and maintain the desired homogeneity, it is frequently advisable and even necessary to use an excess of one or the other of the reactants. For instance, when 1H,1H,3H-tetrafluoropropyl alcohol was used in excess, and was mixed with ferric chloride (e.g., at 80° C.) in a reaction vessel, and when carbon tetrachloride was slowly added thereto, the reaction occurred immediately and relatively violently; the temperature rose to about 95° C. before the mixture started to cool down. Without being limited to any theory of the case, it is believed that the excess fluoro-alcohol dissolved enough carbon tetrachloride to initiate the reaction.

Any suitable solvent which permits the maintenance of a homogeneous system, may be used. Of course, as indicated, the reactants themselves frequently act as the solvent to form the desired homogeneous system. In some instances, the carbon tetrachloride acts as the desired solvent. On the other hand, when carbon tetrachloride is to be reacted (according to the present process) with a fluoro-alcohol, it is advantageous to add carbon tetrachloride in stoichiometric equivalent to an alcohol-chloroform solution and the catalyst (e.g., ferric chloride). This produces a reaction system in which the alcohol and the intermediate are more soluble, and homogeneity (except possibly for the catalyst) can be maintained, thus increasing reaction rate and yield. Diethyl ether and nitrobenzene may be listed as illustrative, non-limiting examples of other solvents which may be used at least in some cases, it being understood that still other solvents (the presence of which although frequently advisable, but not essential) can be readily known or determinable by those skilled in the art.

The catalyzed reaction described and claimed herein may be effected over a wide range of temperatures and operating conditions. However, as a general rule, in order to obtain good yields of the orthocarbonates it is preferred to use reflux temperatures. Thus, when carbon tetrachloride was brought together with a fluoro alcohol (of the class defined herein) in the presence of a catalytic amount of ferric chloride, the best yields of the corresponding orthocarbonate were obtained when the reaction was conducted at about 76°–78° C. The yield of the desired orthocarbonate of the fluoroalcohol used dropped markedly when the reaction temperature was raised above 78° C. or kept at temperatures below 76° C. Since the reaction temperature (at least in some instances) dropped at the start of the reaction, possibly due to the cooling effect of the evolved hydrogen chloride, as well as solvent (i.e., carbon tetrachloride) entrainment, it is frequently necessary to provide means for adding heat to the vessel containing the reactants and the catalyst.

It is to be noted that the optimum operating temperatures may in some cases be different from the reflux temperatures, it being understood that those skilled in the art may readily determine the optimum or desired temperature to be used in each given instance.

It is to be reiterated that it is possible to use any process in which the subject reactants are brought in contact with each other in the presence of the defined class of acid-acting catalysts. Thus, one may introduce carbon tetrachloride and a catalytic amount of ferric chloride into a vessel, preferably maintained at reflux temperature, and add any one of the above-defined perfluoro-alcohols thereto, preferably gradually. On the other hand, as indicated above, the alcohol and the catalyst may be first combined and heated to the desired or optimum temperature, the carbon tetrachloride may then be added. Finally, both reactants and the catalyst may be mixed together and the total mixture brought to and maintained at the desired temperature for the necessary or desired period of time.

It has been indicated that the above-described process, in which compounds of the type of carbon tetrachloride are brought in intimate contact with certain highly fluorinated aliphatic primary alcohols, in the presence of acid-acting catalysts, e.g., ferric chloride, results in the formation of a novel class of compounds having valuable properties, whether used as such or as intermediaries for or ingredients in other compounds or compositions.

The novel class of highly fluorinated organic compounds which result from the above-described reaction, constituting one facet of the present invention, comprises orthocarbonates having the following general structural formula:

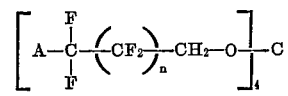

in which $n$ is an integer of from zero to ten, and A is hydrogen or a halogen, preferably fluorine. A preferred class of the novel orthocarbonates comprises those in which the A in the general formula last described represents hydrogen. The following are illustrative examples of the novel compounds which may be formed by the process of the present invention:

1H,1H,12H-docosanofluorododecyl orthocarbonate,
1H,1H,7H-dodecafluoroheptyl orthocarbonate,
1H,1H,5H-octafluoropentyl orthocarbonate,
1H,1H,3H-tetrafluoropropyl orthocarbonate,
1H,1H-pentafluoroproyl orthocarbonate,
1H,1H-heptafluorobutyl orthocarbonate,
2-chloro-2,2-difluoroethyl orthocarbonate.

These novel fluorinated orthocarbonates find many uses. Thus, because of their relatively high stability to heat and oxidation, as well as their fire resistance, they are highly suitable as hydraulic fluids, heat-exchange fluids, lubricants, and dielectric fluids, as well as intermediates in the preparation and formulation of these and like fluid compositions.

The following examples are given by way of illustrating certain details of the invention and not by way of limitations of the inventions:

EXAMPLE I

Ferric chloride for use in this and the subsequent examples was a commercial sublimed anhydrous grade ferric chloride which was re-dried before use in the particular experimental example by reflux in carbon tetrachloride for at least 16 hours. This method of making the ferric chloride catalyst anhydrous has been described in greater detail in my article published in 1960 in the Journal of Organic Chemistry vol. 25, at p. 1115 et seq.

A mixture consisting of 16 grams (0.01 mole) of anhydrous ferric chloride in 75 ml. of carbon tetrachloride was disposed in a vessel surrounded by a heating mantle, heat input from this heating mantle being adjusted so as to maintain the temperature within the vessel at about 76°–78° C., which is approximately the reflux temperature of the carbon tetrachloride. The aforementioned $CCl_4 + FeCl_3$ mixture was maintained in a state of vigorous agitation by stirring, and 83 grams (0.25 mole) of 1H,1H,7H-dodecafluoroheptanol was added dropwise over a period of about 2½ hours, after which both the agitation and heating was continued for about six more hours until hydrogen chloride evolution dropped to a very slow rate. The ferric chloride catalyst was then filtered off from the dark-colored reaction mixture, and the reaction solution was dissolved in diethyl ether, washed several times with water, and dried, the solvents being removed by subjecting the solution to a partial pressure of about 25–35 mm. of mercury. This left a dark viscous oily product which was fractionated to yield about 28 grams of 1H,1H,7H-dodecafluoroheptyl orthocarbonate having a boiling point of 170° C. at a pressure of 0.008 mm. of Hg. This amounted to a yield of about 35% based on total conversion of the reactants.

EXAMPLE II

About 66 grams of 1H,1H,7H-dodecafluoroheptanol was dissolved in 100 ml. of chloroform, and about 11 grams of anhydrous ferric chloride was then added to the solution. The mixture thus obtained was then heated to reflux temperature, and 10.4 grams of carbon tetrachloride was added to the refluxing mixture over a period of about 30 minutes. Thereafter, the reaction mixture was held at the reflux temperature for an additional 5 hours, after which it was cooled, filtered, and filtrate dissolved in diethyl ether. The ether solution was then washed several times with water, separated dried and evaporated at 30 mm. Hg. pressure and 30° C. to an oily residue. Fractionation of the latter yielded 23 grams (35% based on the conversion) of 1H,1H,7H-dodecafluoroheptyl orthocarbonate having a B.P. of 170° C. at 0.008 mm. Hg pressure.

EXAMPLE III

A mixture of 15 g. of 1H,1H,3H-tetrafluoropropanol and 4.3 g. of ferric chloride was heated to 70° C. To this mixture 8.0 g. of carbon tetrachloride was added dropwise. After the addition of about 1 g. of carbon tetrachloride, the reaction temperature suddenly increased to about 95° C. with vigorous hydrogen chloride evolution. Heat was removed and additional carbon tetrachloride was added while the reaction maintained itself without external heat input (for about one hour). After the vigor of the reaction subsided, the mixture was heated at between 70° C. and 80° C. for an additional 2 hours. The resulting cooled residual black oil was then poured into diethyl ether, and filtered. The filtrate was washed with water, dried and the solvent removed at 30° C. and 15 mm. Hg pressure. Distillation of the residue gave a 30% yield of 1H,1H,3H-tetrafluoropropyl orthocarbonate having a boiling point of about 64° C. at 0.1 mm. Hg pressure.

EXAMPLE IV

When the experiment described in Example I is repeated with the exception that 1H,1H-perfluorobutanol is used instead of 1H,1H,7H-dodecafluoroheptanol, the viscous oily reaction product, upon fractionation yields 1H,1H-perfluorobutyl orthocarbonate.

While various preferred methods of procedure, reagents and catalysts have been referred to in the description and examples cited above, the invention is capable of wide variation to produce the novel compounds, and it should be understood that the specific embodiments of the invention described above are intended to be illustrative only and are not intended to limit the scope of the invention.

I claim:

1. In a process for the production of heat-stable highly fluorinated orthocarbonates, the steps of intimately commingling a substantially perfluorinated primary aliphatic alcohol having the general structural formula

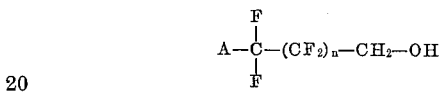

wherein $n$ is an integer from zero to ten, and A is selected from the group consisting of hydrogen and a halogen, with a tetrahalo methyl compound having the general structural formula $$Y_4-C$$

wherein each Y is selected from the group consisting of chlorine and bromine, and effecting said commingling in the presence of a catalytic amount of a substantially anhydrous acid-acting catalyst selected from the group consisting of a ferric halide, an antimony halide and an aluminum halide, said halide being a chloride, bromide or iodide.

2. In a process according to claim 1, wherein the reactants are maintained under reflux conditions until evolution of hydrogen halide is substantially ended.

3. The process according to claim 1, wherein the tetrahalomethyl compound is carbon tetrachloride.

4. The process according to claim 1, wherein the tetrahalomethyl compound is carbon tetrachloride, and wherein the acid-acting catalyst is ferric chloride.

5. A heat-stable highly fluorinated orthocarbonate having the general structural formula

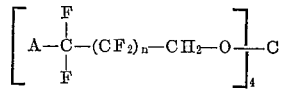

wherein $n$ is an integer of from zero to ten, and A is selected from the group consisting of hydrogen and a halogen.

6. A heat-stable substantially perfluorinated orthocarbonate according to claim 5, which has the general structural formula

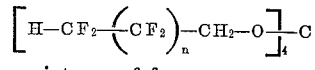

wherein $n$ is an integer of from one to ten.

7. A compound, according to claim 6, 1H,1H,7H-dodecafluoroheptyl orthocarbonate, having the structural formula

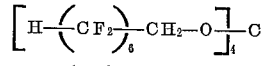

said orthocarbonate having a boiling point of about 170° C. at 0.008 mm. Hg pressure.

References Cited

Hill et al.: Jour. Org. Chem., 30 (2), pp. 411–415, 1965.

LEON ZITVER, *Primary Examiner.*

HOWARD T. MARS, *Assistant Examiner.*

U.S. Cl. X.R.

252—54, 65, 77